United States Patent
Krauβ et al.

(10) Patent No.: US 9,221,388 B2
(45) Date of Patent: Dec. 29, 2015

(54) METHOD FOR REDUCING THE MOVEMENTS OF LIGHT FROM A MOVABLE LIGHT SOURCE

(71) Applicant: Hella KGaA Hueck & Co., Lippstadt (DE)

(72) Inventors: Andreas Krauβ, Erwitte (DE); Boris Kubitza, Möhnesee-Körbecke (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 76 days.

(21) Appl. No.: 14/098,227

(22) Filed: Dec. 5, 2013

(65) Prior Publication Data
US 2014/0163821 A1     Jun. 12, 2014

(30) Foreign Application Priority Data
Dec. 12, 2012   (DE) .......................... 10 2012 112 128

(51) Int. Cl.
*B60Q 1/12*   (2006.01)

(52) U.S. Cl.
CPC .......... *B60Q 1/122* (2013.01); *B60Q 2300/122* (2013.01)

(58) Field of Classification Search
None
See application file for complete search history.

(56) References Cited

U.S. PATENT DOCUMENTS

| 7,053,762 | B2 * | 5/2006 | Sakai | 701/49 |
| 2002/0040281 | A1 * | 4/2002 | Okuchi et al. | 702/151 |
| 2002/0163794 | A1 * | 11/2002 | Hayami | 362/40 |
| 2007/0046239 | A1 * | 3/2007 | Hashizume | 318/575 |
| 2009/0052156 | A1 * | 2/2009 | Mano | 362/37 |

FOREIGN PATENT DOCUMENTS

| DE | 10342927 A1 | 4/2005 |
| DE | 102005051062 A1 | 4/2006 |
| DE | 102004055883 A1 | 6/2006 |

\* cited by examiner

*Primary Examiner* — Rami Khatib
*Assistant Examiner* — David Merlino
(74) *Attorney, Agent, or Firm* — Husch Blackwell LLP

(57) ABSTRACT

A method for reducing the movements of light from at least one movable light source for a motor vehicle with a steering wheel, wherein a movement of the steering wheel causes a movement of the light source includes the steps of detecting a current steering wheel angle and at least one steering wheel angle change coming from the current steering wheel angle is detected over a defined time window and the steering wheel angle change is summed to form a magnitude, wherein simultaneously a number of steering wheel changes in direction is detected within the defined time window, wherein a characteristic value is allocated to each magnitude and the associated number of changes, wherein a comparison of the characteristic value with a limiting value is performed and a decision is made with reference to the comparison whether additional movement of the light source is carried out.

9 Claims, 2 Drawing Sheets

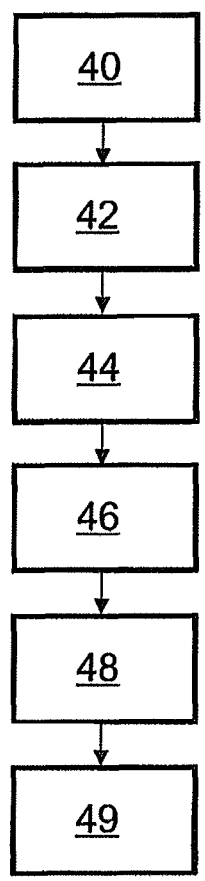 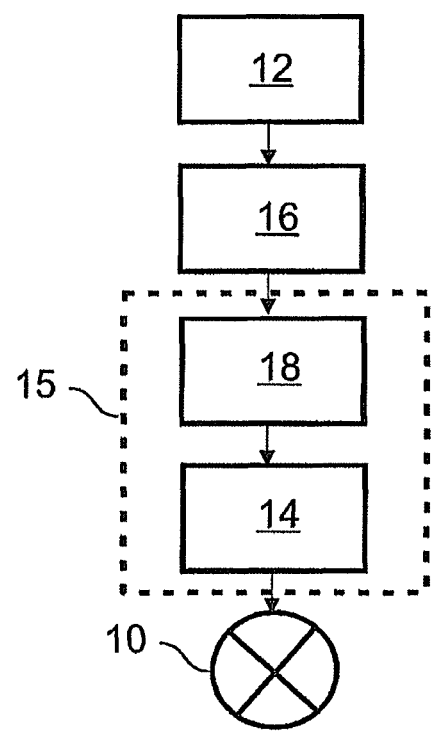
Figure 1                    Figure 2

METHOD FOR REDUCING THE MOVEMENTS OF LIGHT FROM A MOVABLE LIGHT SOURCE

CROSS REFERENCE

This application claims priority to German Patent Application No. 10 2012 112128.1, filed Dec. 12, 2012.

TECHNICAL FIELD OF THE INVENTION

The invention relates to a method for reducing the movements of light from at least one movable light source. Furthermore, the invention also relates to a device for reducing the movements of light from a movable light source. The movement of a light source is understood to be, on one hand, the ability to change the light distribution of the light source, e.g., mechanically by means of a swiveling actuator and, on the other hand, the ability to realize a light distribution of the light source by turning on and off several light sources.

BACKGROUND OF THE INVENTION

From DE 10 2007 012 834 A1, a method for realizing a cornering light function of a vehicle headlamp is known, wherein the headlamp can be swiveled essentially about a vertical swivel axis. This makes it possible to adapt the light cone of the headlamp to a course of a roadway. Here, the swiveling speed of the headlamp is changed adaptively to the driving manner of a driver by means of detecting a driving state. However, it has proven disadvantageous that the realization of such a driving state detection is very complicated, because many state parameters of the motor vehicle must be known. These include, among others, the identification of the state of, e.g., the steering angle of a steering wheel, the speed and yaw rate of the motor vehicle, and the positions of the accelerator pedal, brake pedal, and gear shift.

SUMMARY OF THE INVENTION

The problem of the present invention is to disclose a method and a device for reducing the movements of light from a movable light source, wherein the method and the device use simple measurement techniques and have reliable constructions, allowing a quick and precise reduction of the movements of light from a movable light source. In particular, one problem of the invention is to also reduce the movements of light not corresponding to the course of the road and thus to level out or harmonize the light movements.

To solve this problem, a method with the features of Claim 1 and a device with the features of Claim 5 are proposed, in particular, with the features of the respective characterizing sections. Preferred refinements are listed in the dependent claims. Here, the features mentioned in the claims and in the description can be considered essential to the invention in themselves or in combination. Features and details that are described in connection with the method according to the invention are obviously also applicable in connection with the device according to the invention and vice versa. Here, the features mentioned in the claims and in the description can be considered essential to the invention individually or in combination.

The invention discloses a method for reducing the movements of light from at least one movable light source for a motor vehicle with a steering wheel, wherein a movement of the steering wheel causes a movement of the light source. According to the invention it is provided here that a current steering wheel angle is detected. Coming from the current steering wheel angle, a steering wheel angle change is detected over a defined time window. Here, the steering wheel angle change is summed to form a magnitude, wherein simultaneously a number of steering wheel changes in direction within the defined time window is detected. A characteristic value is allocated to each magnitude and the associated number of changes, wherein a comparison of the characteristic value with a limiting value is carried out. A decision is made with reference to the comparison whether additional movement of the light source is carried out. The advantage of the method for reducing the movement of light from a movable light source lies in the consideration of only one parameter, namely the changes over time of the steering wheel angle. Additional parameters of the motor vehicle are not needed for determining whether additional movement of the light source is carried out. A reduction of light movements that do not correspond to the course of the road can be carried out. Furthermore, the method is not limited only to while driving on straight sections of roads. The method can be applied in all driving situations, especially to driving on straight sections of roads or driving around a curve, and is independent of the actual radius of curvature. In addition, it is possible to quickly detect and quickly reduce light movements that do not correspond to the course of the road, because only the steering wheel angle must be evaluated. No other interfaces for additional vehicle parameters are required, because only the steering wheel angle must be evaluated. The method makes possible a reduction of light movements that do not correspond to the course of the road with the help of limiting values. These limiting values make it possible to distinguish between steering wheel movements that should not lead to movement of the light source and steering wheel movements that should lead to movement of the light source.

It is advantageous that a characteristic curve is defined by at least two limiting values. The definition of at least two limiting values to form a characteristic curve offers the advantage that a comparison can be carried out over a larger characteristic value region. In a two-dimensional coordinate system, the x-axis can record the number of steering wheel angle changes, i.e., the frequency of steering wheel changes in direction. The y-axis in the coordinate system can record the sum of a magnitude of the steering wheel angle changes. Here it can be imagined that a characteristic curve is defined by interpolating discrete limiting values. A dynamic adaptation of the characteristic curve can also be carried out. Here it can be imagined to introduce a z-coordinate that converts the two-dimensional coordinate system into a three-dimensional coordinate system, wherein the characteristic curve is expanded into a characteristic curve field. The z-coordinate can indicate the intensity of the filtering. This makes it possible to create an applicable characteristic curve field on the intensity of the filtering.

It is advantageous that the characteristic curve divides a coordinate system into a first region and a second region, wherein additional movement of the light source is prevented when the characteristic value is in the first region or additional movement of the light source is carried out when the characteristic value is in the second region. If the characteristic value comes to lie in the first region, then this means that the play response has not been detected. In other words, the occurrence of light movements that do not correspond to the course of the road is very unlikely. In contrast, a play response of the steering wheel has been detected when the characteristic value is assigned to the second region. In other words, in this case the occurrence of light movements that do not correspond to the course of the road is very likely. Thus the first region spans an applicable time window, wherein in this time window it is applicable that an undesired movement of the steering wheel that does not correspond to the course of the road is very unlikely, so that additional movement of the light source with reference to the steering wheel angle change is carried out. In contrast, the second region spans an applicable time window in which an undesired steering wheel play by the user of a motor vehicle has been identified when a characteristic value comes to lie in this second region. In other words, the occurrence of light movements that do not correspond to the course of the road is thus very likely. Depending on the calculated characteristic values, e.g., the system can switch between two applicable filter time constants for a filter, wherein the transitions between the filter time constants can take place over configurable ramps.

It is advantageous that a filtering of a crossover of the characteristic value is carried out. This takes place advantageously, for example, when the characteristic value switches between the first region and the second region. Therefore, a dynamic adaptation of the filtering of a swivel angle target value can take place, for example, by adapting the time constants for a filter as a function of an applicable limiting value.

The problem according to the invention is also solved by a device for reducing the movements of light from a movable light source for a motor vehicle with a steering wheel. By moving the steering wheel, a movement of the light source can be actuated by a control unit. For this purpose it is provided according to the invention that a current steering wheel angle can be detected by a sensor. The sensor is here connected to a computing unit. The sensor can detect at least one steering wheel angle change coming from the current steering wheel angle over a defined time window. The steering wheel angle change can be summed by the computing unit to form a magnitude, wherein simultaneously a number of steering wheel changes in direction can be detected by the computing unit within the defined time window. A characteristic value can be allocated to each magnitude and the associated number of changes, wherein a comparison of the characteristic value with a limiting value is carried out by the computing unit. A decision is made with reference to the comparison whether additional movement of the light source is actuated by the control unit. Advantageously the use of only one sensor that can detect the movement of the steering wheel is sufficient. Here, the sensor can detect data on steering wheel angle changes coming from a current steering wheel angle and forward this data to a computing unit. The computing unit can further evaluate this data transmitted from the sensor. The computing unit can determine the magnitude of the steering wheel angle changes coming from the current set steering wheel angle. To detect steering wheel changes in direction within the defined time window it can be imagined that the data of the steering wheel angle changes are converted into a function, wherein a detection of the steering wheel angle change is detected by determining the zero crossings of the first derivative of the function. In addition it can be imagined that the steering wheel angle changes are not sent continuously to the computing unit, but instead discrete values are sent to the computing unit. The computing unit can determine the function by interpolating the transmitted values. This has the advantage that computing units with lower computational capacity can also be used. Here, the use of sensors that otherwise cannot continuously detect the steering wheel angle changes can also be imagined. A performance of the interface between the computing unit and the sensor is also to be considered, so that according to the application, cost-effective components, such as sensors, interfaces, and/or computing units can also be used.

It is advantageous that data of the sensor can be transmitted to the computing unit via a wired or wireless data connection. A wired connection offers the advantage that no latency times are produced. Directly after starting up the computing unit and the sensor, data can be transmitted from the sensor to the computing unit via the wired data connection. Latency times, i.e., waiting times, until data transmission can take place are not applicable here. In contrast, the wireless data connection offers a very cost-effective variant for transmitting the data of the sensor to the computing unit, because no installation space must be provided within the motor vehicle for a permanent cable. The wireless data connection can be set up over Bluetooth or wireless-LAN.

It is further advantageous that the sensor is a potentiometer, an inductive component, a capacitive component, or an optoelectronic component. Potentiometers are very cost-effective electronic components, wherein a resistance value over a resistive track can be tapped continuously by means of the resistive track and a sliding contact. In contrast, an inductive, capacitive, or optoelectronic component offers the significant advantage that the steering wheel angle change can be carried out without friction, i.e., nearly maintenance-free.

It is advantageous that a light distribution of the light source can be changed electromechanically by means of a swiveling actuator or a light distribution can be carried out by turning on and off several light sources. The light source can here be arranged so that it can swivel essentially horizontally on a shaft of the swiveling actuator, wherein the shaft can have a gearwheel. The gearwheel can be driven by means of a second gearwheel that is arranged on an electric motor. This causes the shaft on which the gearwheel is arranged to rotate and accordingly the light source that is likewise arranged on the shaft can be swiveled horizontally. The driving mechanism on the shaft, in this case the second gearwheel, can also be a worm gear. The gearwheel of the electric motor can here engage in the worm gear with positive locking, so that a rotation of the gearwheel of the electric motor causes a rotation of the worm gear. This offers the advantage that an undesired rotation of the shaft causes no rotation of the gearwheel of the electric motor. The change of the light distribution likewise can be realized by means of turning on and off several light sources. This can be carried out, e.g., by means of a fixed LED system, wherein the swiveling can be realized by means of turning on and off LED segments. Other types of lights can also be used as the light source, e.g., incandescent lamps or OLEDs.

It is further advantageous that the control unit and the computing unit are constructed as one unit. The control unit has a first and a second interface. The control unit is here connected to the computing unit via the first interface and to the movable light source that can be driven electromechanically via the second interface. The control unit here provides the electric power for the light source that can be driven electromechanically. The control unit is controlled by the computing unit. Therefore, the computing unit and the control unit can be constructed as one unit, wherein this unit is connected directly to the light source via an interface. Naturally, this means that the unit made from the control unit and the computing unit must also provide the electrical power for moving the light source. The light source can be moved here electromechanically or also pneumatically.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 a schematic view of the method according to the invention,

FIG. 2 a schematic view of the device according to the invention,

DETAILED DESCRIPTION

Figure 3:
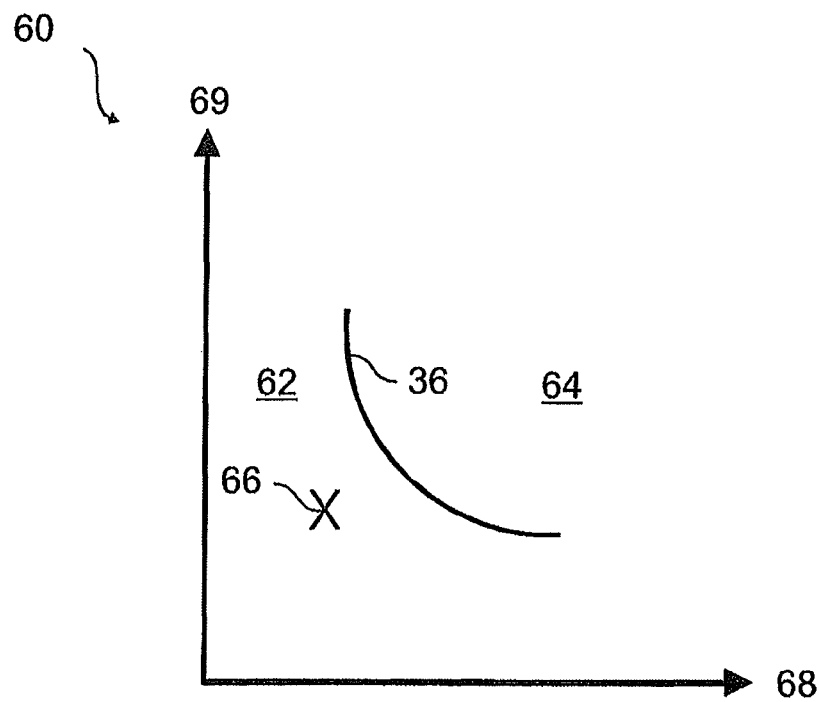
FIG. 3 a diagram with a characteristic curve.

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

In FIG. 1, a schematic diagram is shown for detecting light movements that do not correspond to the course of the road. In an initial step 40, the current vehicle steering wheel angle is determined, optionally with filtering. In step 42, steering wheel changes in direction from the vehicle steering wheel angle are detected, for example, by determining the zero crossings of the first derivative of the function of the vehicle steering wheel angle. In a step 44, the steering wheel angle changes between the detected steering wheel changes in direction are summed and calculated to form the magnitude. In a step 46, the number of steering wheel changes in direction, i.e., the frequency of steering wheel changes in direction, is determined. In a step 48, a characteristic value is assigned from the magnitude of the steering wheel angle change and the number of steering wheel changes in direction within a defined time window. In a next step 49, the characteristic value is compared with a limiting value. If both the calculated sum of the steering wheel angle changes between detected steering wheel changes in direction and also the number of steering wheel changes in direction exceed a limiting value within an applicable time window, wherein the evaluation can be carried out using data from the past, then a play response of the motor vehicle user is identified, wherein additional movement of the light source is prevented. However, if the calculated sum of the steering wheel angle changes between detected steering wheel changes in direction or the number of steering wheel changes in direction is below the limiting value for an applicable duration, then a play response of the motor vehicle user is no longer identified and the movement of the light source with reference to the steering wheel angle change is not stopped. Here, a dynamic adaptation of a filtering of the swivel angle target values can take place, for example, by adapting the time constants for a filter as a function of an applicable characteristic curve field. It is further conceivable that a filtering of the swivel angle target values is carried out, for example, by switching between two or more applicable time constants for a filter, wherein the transitions between the filter time constants are carried out by means of configurable ramps for the goal of preventing visible jumps.

In FIG. 2, a schematic view of the device according to the invention is shown. A steering wheel 12 is connected to a sensor 16 that detects data on the steering wheel changes in direction of the steering wheel 12. The sensor 16 is connected to a computing unit 18, wherein the data that the sensor 16 detects on the steering wheel angle changes is transmitted to the computing unit 18. The computing unit 18 is connected here to a control unit 14, wherein the control unit 14 can control a movable light source 10. The control unit 14 and the computing unit 18 can be constructed as one unit 15.

In FIG. 3, a diagram with a characteristic curve 36 is shown in a two-dimensional coordinate system 60 with an x-axis 68 and a y-axis 69. The number of steering wheel angle changes can be recorded on the x-axis 68, i.e., the frequency of steering wheel changes in direction. The sum of a magnitude of the steering wheel angle changes can be recorded on the y-axis 69 in the coordinate system 60. Here, many limiting values can be used to form a characteristic curve 36. The limiting values do not have to cover a continuous value range. Discrete limiting values can also lead to a continuous characteristic curve 36 through interpolation. Here, a comparison of a calculated characteristic value 66 is carried out with the characteristic curve 36. If the calculated characteristic value 66 within a defined time window is to the right of the characteristic curve 36, i.e., in a second region 64, then a play response of the steering wheel angle change caused by a user of a steering wheel has been identified, so that the movement of a light source is stopped. If the calculated characteristic value 66 is on or to the left of the characteristic curve 36, i.e., in a first region 62, then the play response of the user of the steering wheel of the motor vehicle has not been identified, so that the movement of the light source is carried out with reference to the steering wheel angle changes. Here, depending on the calculated characteristic values 66, the system can switch between two applicable filter time constants for a filter, wherein the transitions between the filter time constants can take place over configurable ramps.

Figure 4:
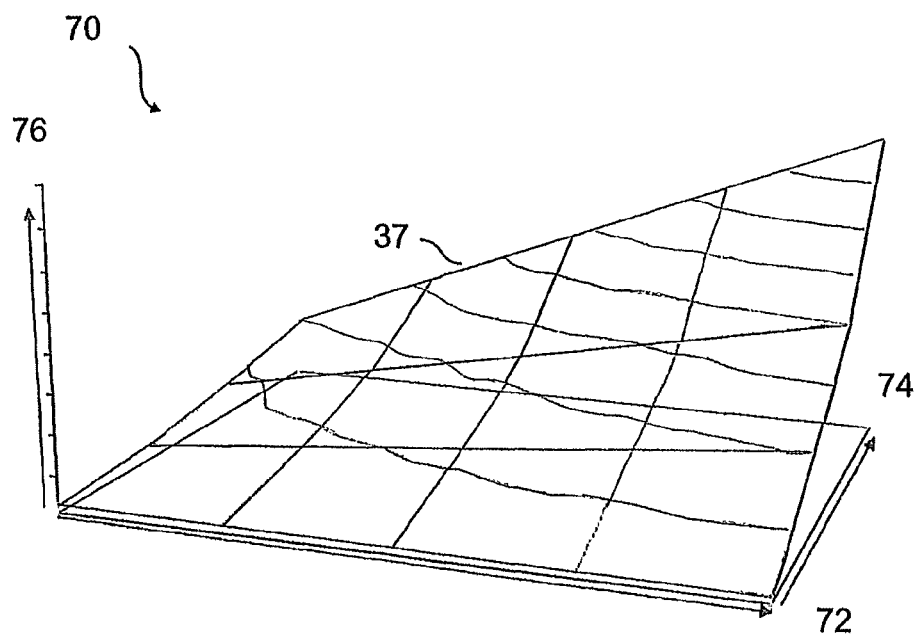
FIG. 4 a diagram with a characteristic curve field.

In FIG. 4, a diagram with a characteristic curve 37 is shown in a three-dimensional coordinate system 70 with an x-axis 72, a y-axis 74, and a z-axis 76. A sum of the magnitude of the steering wheel angle change is recorded on the x-axis 72. The number of steering wheel angle changes, i.e., the frequency of the steering wheel changes in direction, can be recorded on the y-axis 74. An intensity of the filtering can be recorded on the z-axis 76. If the calculated characteristic values are within a defined time window above the characteristic curve field 37, then it is applicable that a play response of the user of a steering wheel of a motor vehicle has been identified, so that additional movement of a light source is ruled out. If the calculated characteristic values are on or below the characteristic curve field 37, then a play response of the user of the steering wheel of the motor vehicle has not been identified, i.e., the movement of the light source proportionally follows the steering wheel angle change of the steering wheel. The filtering can be set adaptively depending on the calculated characteristic values.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

LIST OF REFERENCE SYMBOLS

10 Light source
12 Steering wheel
14 Control unit
15 Unit
16 Sensor
18 Computing unit
36 Characteristic curve
37 Characteristic curve field
40 Processing step
42 Processing step
44 Processing step
46 Processing step
48 Processing step
49 Processing step
60 Two-dimensional coordinate system
62 First region
64 Second region
66 Characteristic value
68 x-axis
69 y-axis
70 Three-dimensional coordinate system
72 x-axis
74 y-axis
76 z-axis

The invention claimed is:

1. A method for reducing the movements of light from at least one movable light source for a motor vehicle with a steering wheel, wherein a movement of the steering wheel causes a movement of the light source, comprising the steps of:
    detecting a current steering wheel angle with a sensor;
    detecting at least one steering wheel angle change coming from the current steering wheel angle with the sensor over a defined time window;
    summing the at least one steering wheel angle change to form a magnitude;
    detecting a number of steering wheel changes in direction within the defined time window with the sensor;
    determining a characteristic value based on the magnitude and the associated number of changes;
    comparing the characteristic value with a limiting value; and
    moving the light source when the limiting value is greater than the characteristic value.

2. The method according to claim 1, wherein a characteristic curve is defined by at least two limiting values.

3. The method according to claim 2, wherein the characteristic curve divides a coordinate system into a first region and a second region, wherein additional movement of the light source is prevented when the characteristic value is in the first region or additional movement of the light source is carried out when the characteristic value is in the second region.

4. The method according to claim 1, wherein a filtering of a crossover of the characteristic value is carried out.

5. A device for reducing the movements of light from at least one movable light source for a motor vehicle with a steering wheel, wherein through a movement of the steering wheel, a movement of the light source can be actuated by a control unit, comprising:
    a sensor connected to the steering wheel, said sensor configured to detect a current steering wheel angle,
    a computing unit connected to the sensor, and
    wherein at least one steering wheel angle change coming from the current steering wheel angle is detected by the sensor over a defined time window and is summed by the computing unit to form a magnitude, wherein simultaneously a number of steering wheel changes in direction within the defined time window is detected by the computing unit, wherein a characteristic value is allocated to each magnitude and the associated number of changes, wherein additional movement of the light source is actuated by the control unit when the limiting value is greater than the characteristic value.

6. The device according to claim 5, further comprising a wired or wireless data connection for transmitting data of the sensor to the computing unit.

7. The device according to claim 5, wherein the sensor is one of a potentiometer, an inductive component, a capacitive component, or an optoelectronic component.

8. The device according to claim 5, wherein a light distribution of the light source is changed electromechanically by means of a swiveling actuator or a light distribution is carried out by turning on and off several light sources.

9. The device according to claim 5, wherein the control unit and the computing unit are constructed as one unit.

* * * * *